(12) United States Patent
Boldy

(10) Patent No.: US 6,654,003 B2
(45) Date of Patent: Nov. 25, 2003

(54) CURSOR CONTROL DEVICE

(75) Inventor: Manfred Boldy, Horb a.N. (DE)

(73) Assignee: International Business Machines Corporation, Armonk, NY (US)

(*) Notice: Subject to any disclaimer, the term of this patent is extended or adjusted under 35 U.S.C. 154(b) by 132 days.

(21) Appl. No.: 09/998,280

(22) Filed: Nov. 30, 2001

(65) Prior Publication Data

US 2002/0084983 A1 Jul. 4, 2002

(51) Int. Cl.[7] .................................................. G09G 5/08
(52) U.S. Cl. ........................................................ 345/157
(58) Field of Search ................................. 345/156, 157, 345/159, 160, 161, 163, 164, 165, 166, 167, 701, 702; 74/471 XY, 471 R; 273/148 B

(56) References Cited

U.S. PATENT DOCUMENTS

| | | | | |
|---|---|---|---|---|
| 4,868,549 A | * | 9/1989 | Affinito et al. ............. | 345/164 |
| 5,508,717 A | * | 4/1996 | Miller ........................ | 345/858 |
| 5,781,172 A | * | 7/1998 | Engel et al. ................. | 345/164 |
| 5,790,108 A | * | 8/1998 | Salcudean et al. .......... | 345/184 |
| 5,847,695 A | * | 12/1998 | Duncan et al. ............. | 345/163 |
| 5,914,705 A | * | 6/1999 | Johnson et al. ............. | 345/163 |
| 6,115,029 A | * | 9/2000 | Jaaskelainen et al. ....... | 345/159 |
| 6,144,370 A | * | 11/2000 | Eleyan et al. ............... | 345/167 |
| 6,401,209 B1 | * | 6/2002 | Klein ......................... | 713/200 |
| 2003/0080970 A1 | * | 5/2003 | Sombroek et al. .......... | 345/615 |

* cited by examiner

Primary Examiner—Xiao Wu
(74) Attorney, Agent, or Firm—J. Bruce Schelkopf

(57) ABSTRACT

A cursor control device, such as a trackball, controls the movement of a cursor on a computer display. An electromagnetically generated braking effect is applied to the trackball, which effect varies with the speed of the cursor to allow precise control of the cursor.

14 Claims, 6 Drawing Sheets

CURSOR CONTROL DEVICE

FIELD OF THE INVENTION

The present invention relates to a cursor control device for controlling the movement of a cursor on a computer display. More specifically, the invention is concerned with such a device that comprises a tracking element.

BACKGROUND OF THE INVENTION

The immense rise in popularity of personal computers is in large part attributable to improvements in user-machine interfaces. More particularly, improvements in data input devices, such as the mouse and the trackball, have made communication with computers easy and convenient, thus increasing the usefulness of computers.

As is well known, a mouse and a trackball are useful devices for positioning a cursor on a computer display. To quickly and efficiently input certain types of data or commands to a computer, the cursor is positioned on an appropriate spot on the display and then manipulated ("clicked"). It will readily be appreciated that the convenience and, thus, usefulness of the computer is promoted by facilitating rapid, yet precise, cursor placement.

It happens, unfortunately, that rapid cursor positioning is more or less competitive with precise cursor positioning. This is because the faster the cursor moves across the screen, the less time the user has to react to stop the cursor when it arrives at the desired screen location. Stated differently, the user is provided with only one kind of feedback, namely, visual feedback, to aid the user in stopping a rapidly moving cursor, and visual feedback alone often is insufficient to promote both rapid and precise cursor placement.

It has therefore been suggested to enhance both rapid and precise cursor placement by providing more than one kind of feedback to the user. More specifically, tactile feedback is used in conjunction with visual feedback to promote both rapid and precise cursor placement.

Thus, U.S. Pat. No. 5,889,670 discloses a method and apparatus implementing a user interface device, such as a mouse or trackball, having electronically controllable tactile responsiveness which is flexibly programmable. Programmable force-position characteristics relate the tactile responsiveness of the interface device to the position of the cursor within a limited area or on the display screen. A force generated by a servo motor after converting a digital signal from a controller into an analog current signal is perceived as a resistance, tactile pressure or the lack thereof, or as a positive, assisted motion which is indicative of position on a screen display.

In U.S. Pat. No. 5,973,670 there is disclosed a cursor on a graphics display controlled by a cursor control device including a tactile generator. The tactile generator is activated when the cursor is located at a graphics object that has been determined to be intersecting, and that has a size which bears a predetermined relationship to the speed of the cursor, provided an update time has elapsed since the time of the last tactile activation of the cursor control device.

Though precise placement of the cursor has been enhanced by providing additional tactile feedback, there is still a need to improve cursor control devices comprising a tracking element. These devices are mainly operated with the user's fingertips, his thumb or the palm of his hand. When retracting the user's hand from the cursor control device, e.g., to input data via a keyboard, the device may easily slip due to the fact that the user's hand has no support or that the palm exhibits a certain suction effect.

SUMMARY OF THE INVENTION

It is therefore an object of the present invention to provide a cursor control device for controlling the movement of a cursor on a computer display that avoids the above mentioned disadvantages.

The present invention provides a cursor control device for controlling the movement of a cursor on a computer display, said cursor control device comprising: a tracking element; and a braking device operable to apply a braking force on said tracking element, said braking force being dependent on the speed of said cursor.

The present invention also provides a method for controlling a cursor, said method comprising the steps of: displaying a cursor; moving the cursor in response to manipulation of a cursor control device comprising a tracking element; and generating a user-discernible braking force on said tracking element depending on the speed of said cursor.

Advantageous embodiments of the invention are defined in the dependent claims.

BRIEF DESCRIPTION OF THE DRAWINGS

The invention will hereinafter be described in more detail in connection with the accompanying drawings, in which FIG. 1 schematically depicts an embodiment of an apparatus according to the invention.

DETAILED DESCRIPTION OF THE PREFERRED EMBODIMENTS

Figure 1:
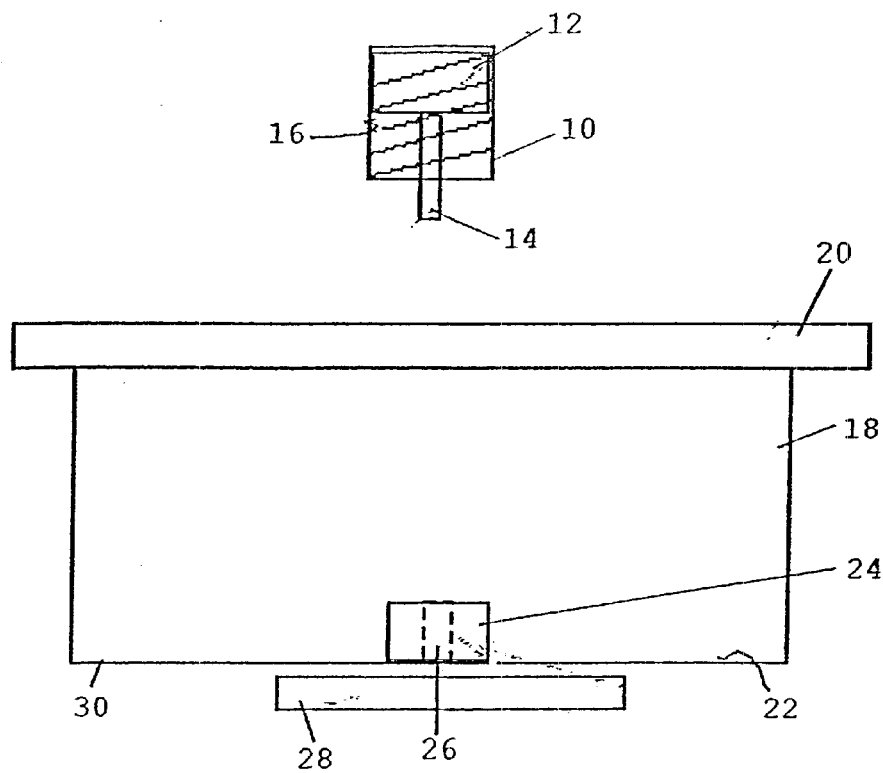

FIG. 1 schematically shows an embodiment of an apparatus according to the invention. The apparatus shown therein consists of two parts and functions like a loudspeaker.

The upper part consists of a cylinder 10, a first iron core 12, a pin 14 and a coil 16. The cylinder 10 is preferably made of aluminum or synthetic material. The coil 16 is wound around the cylinder 10, the first iron core 12 functions as a support for the cylinder 10 and as a magnetic core for the attraction of a tracking element of the cursor control device. The pin 14 is made of brass or synthetic material, i.e., it should be of nonmagnetic material and is connected with the first iron core 12. The first iron core 12 is thereby movably connected with the cylinder 10.

The lower part consists of a pot-like element 18, preferably made of alumina or synthetic material, carrying a felt ring 20 at its upper surface. The felt ring may be provided with an additional specific amount of rubber. At its inner lower surface 22 the pot-like element 18 is provided with a second iron core 24 fixedly connected thereto and having an opening 26 in the middle thereof. The pot-like element 18 is, in turn, provided with an opening which is arranged coaxially to the opening 26, and a plate 28 is arranged at its outer bottom surface 30.

The pin 14 is inserted into the opening 26 of the second iron core 24 and passed through the coaxially arranged opening in the bottom portion of the pot-like element 18, where it is connected to the plate 28.

Thus, the second iron core 24 is slidably arranged around the pin 14 so that it may move up and down along the pin 14. The length of the pin 14 is dimensioned such that the distance between the lower surface of the first iron core 12 and the upper surface of the plate 28 is greater than the thickness of the second iron core 24.

The tracking element 32, having an iron shell, is arranged on top of the pot-like element 18 and is carried by the housing of the device (not shown), thereby not touching the pot-like element 18 in quiescent condition.

When the tracking element 32 is started to move slowly, the coil 16 will be energized.

Figure 2A:
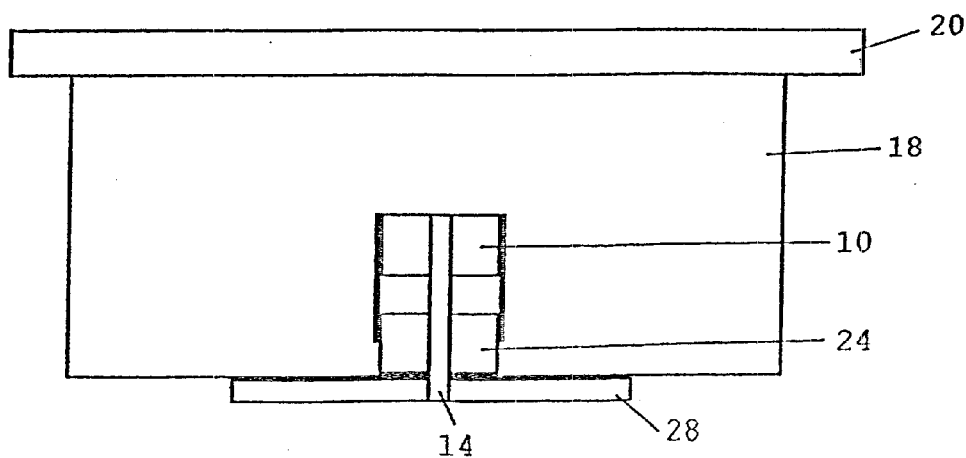
FIGS. 2A and 2B show the apparatus according to FIG. 1 in a non-activated and in an activated state.
Figure 2B:
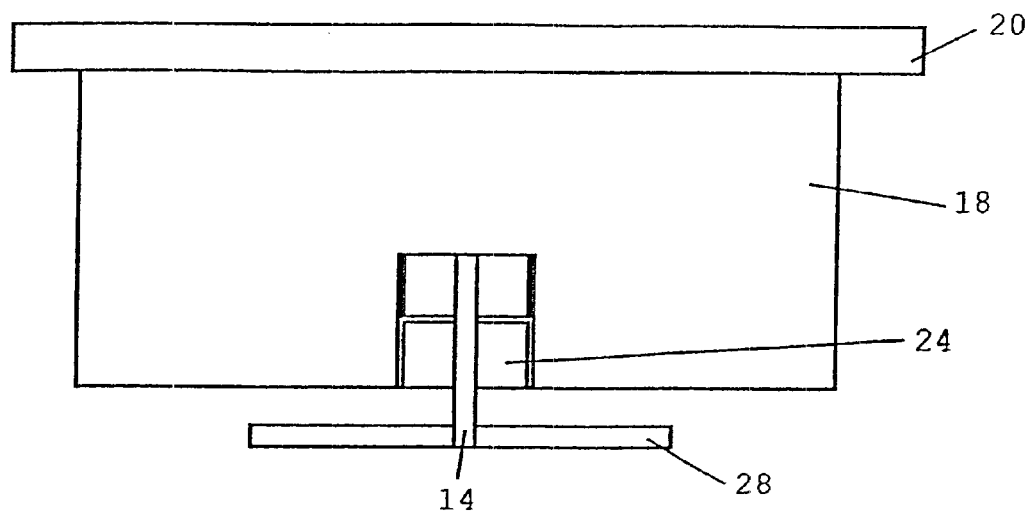

The second iron core 24 is drawn up in the direction of the first iron core 12. Since the pot-like element 18 is fixedly connected to the second iron core 24, it will be drawn up as well. At the same time, the tracking element 32 is drawn in the direction of the second iron core 24, thus bringing the apparatus in an activated state (FIG. 2B). The felt ring 20 will touch the surface of the tracking element 32 thus producing a braking effect on the tracking element.

The braking effect can be released by de-energizing the coil, e.g., by a mouse click or the like.

When accelerating the movement of the tracking element 32, a point will be reached where a magnetic force will no longer exist. At this point, the second iron core 24 will no longer be attracted by the first iron core 12, and the pot-like element 18 will return into its non-activated state (FIG. 2A). Accordingly, the braking effect will cease and the brake will be released.

Since the iron cores 12, 24 have small dimensions, lying in the millimeter range, the pot-like element 18 can be adjusted to different sizes of tracking elements, i.e., smaller or greater pot-like elements 18 can be used. The ratio of dimensions between pot-like element and tracking element thereby is about 1:3.

Providing the felt ring 20 with an additional amount of rubber will increase its resisting force, but not the braking force. Using a "harder" brake covering, i.e., a mixture of felt and rubber, or cork or the like, will need to employ a pulsing brake mechanism. This will be described with respect to FIG. 9 later.

Figure 3:
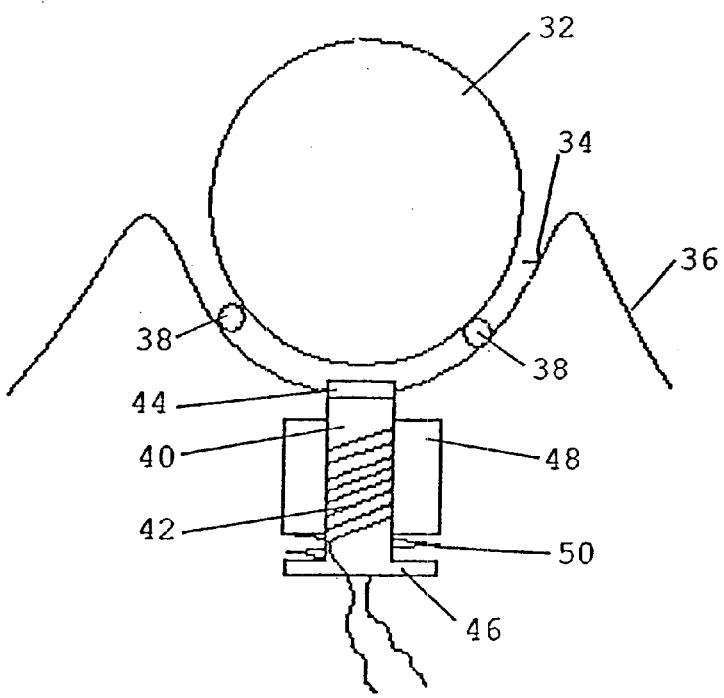
FIG. 3 schematically depicts a second embodiment of an apparatus according to the invention.

FIG. 3 schematically depicts a second embodiment of an apparatus according to the invention. In this embodiment, the tracking element 32 is held in a depression 34 present in the housing 36 of the device by means of ball bearings 38. Within the housing 36, a cylinder 40, preferably made of synthetic material, is arranged below the tracking element 32. Inside the cylinder 40, there is mounted a coil 42. The upper end of the cylinder 40 carries a mat 44 being comprised of a fleece, cork, rubber or the like, the lower end of the cylinder 40 has the form of a round plate 46 which will serve as a stopper, what will be described in more detail below. The coil 42 is inserted into a magnetic ring 48, and a spring 50 is arranged between the ring 48 and the plate 46. The magnetic ring 48 is secured to the housing 36 and the coil 42 rests on the bottom of the housing 36.

When the tracking element 32 is started to move slowly, the coil 42 will be energized, the cylinder 40 will be moved in the direction of the tracking element 32 against the tension of the spring 50. The mat 44 will be pressed against the tracking element 32 thus creating a braking effect. As has already been mentioned above, the round plate 46 will thereby act as a stopper, limiting the movement of the cylinder 40 by abutting to the magnetic ring 48. As already discussed in view of the first embodiment, the braking force will cease when the tracking element is accelerated beyond a certain velocity where no magnetic force will be present any more. The cylinder 40 will, under the tension of spring 50, return into its non-activated position.

Figure 4A:
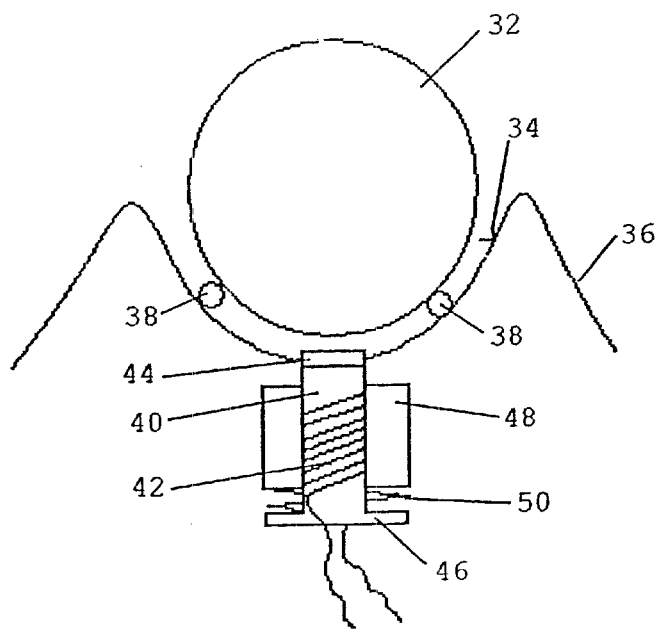
FIGS. 4A and 4B show the apparatus according to FIG. 3 in a non-activated and in an activated state.
Figure 4B:
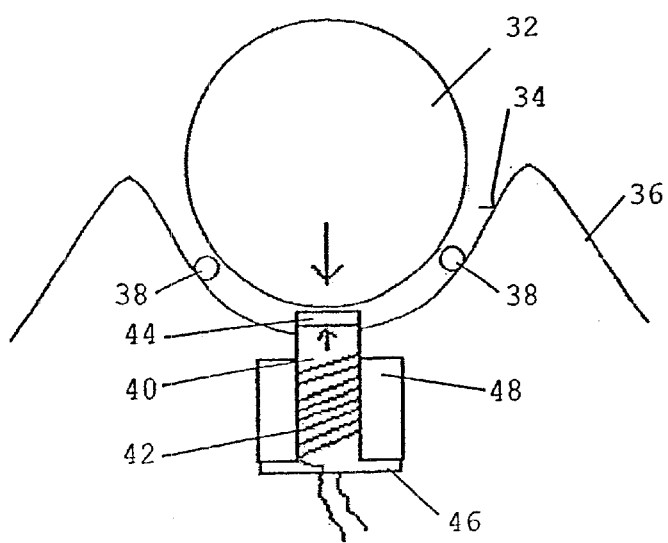

FIGS. 4A and 4B show the apparatus according to the second embodiment in its non-activated and activated state.

Figure 5:
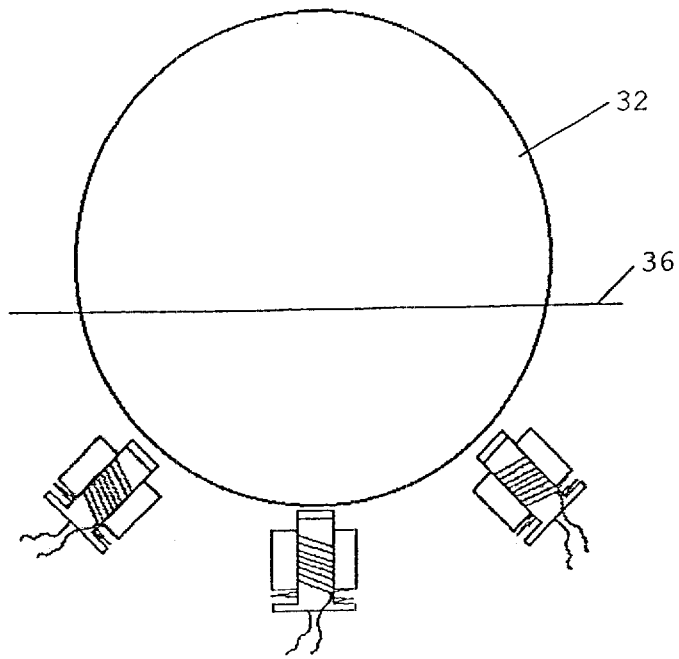
FIG. 5 schematically depicts another embodiment of the present invention.
Figure 6:
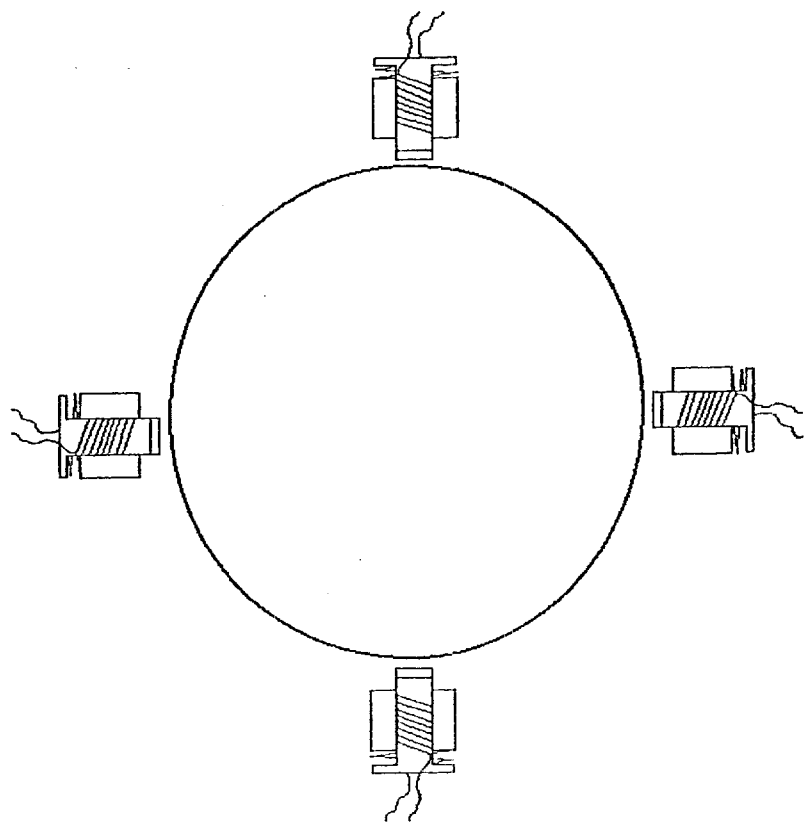
FIG. 6 schematically shows still another embodiment of the invention.

In FIGS. 5 and 6, there are shown still other embodiments of the arrangement shown in FIG. 3. FIG. 5 shows that three coils are arranged one beside the other on the side of the tracking element 32 being arranged within the depression 34. The advantage of such an arrangement is that the tracking element 32 can project far beyond half of the housing 36, without a risk that the tracking element 32 falls out of the depression when it is stopped. FIG. 6 depicts four coils according to the one presented in FIG. 3, which are arranged around the tracking element 32 at an angle of 90°, respectively.

Figure 7:
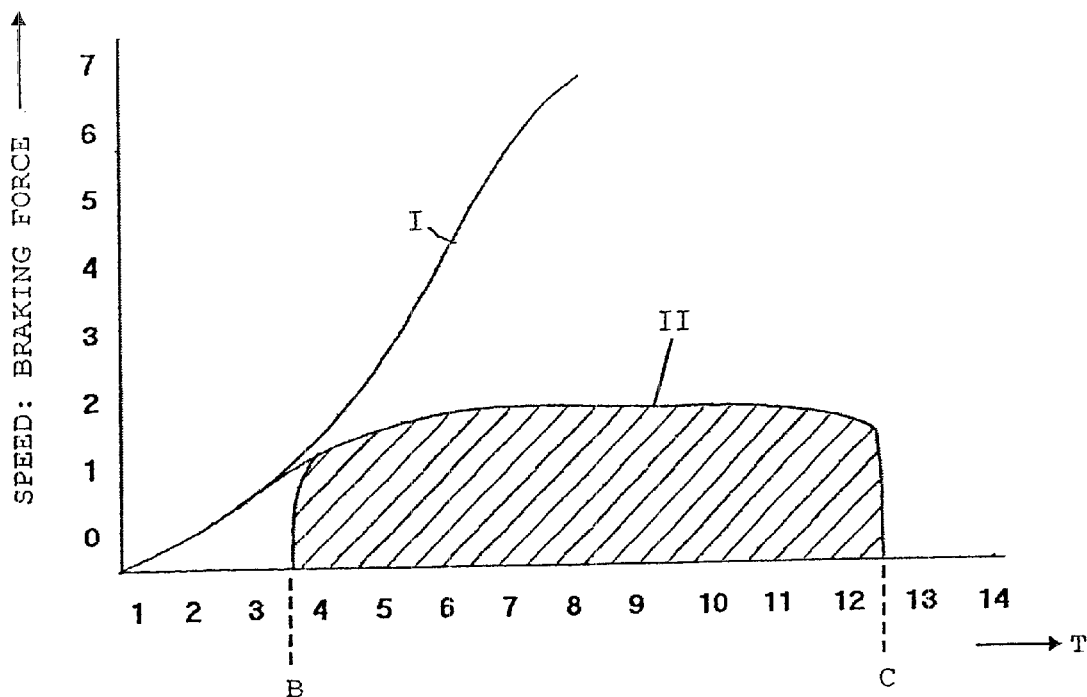
FIGS. 7 to 9 are graphs showing the braking effect relative to the speed of the tracking element for several embodiments of the invention.
Figure 8:
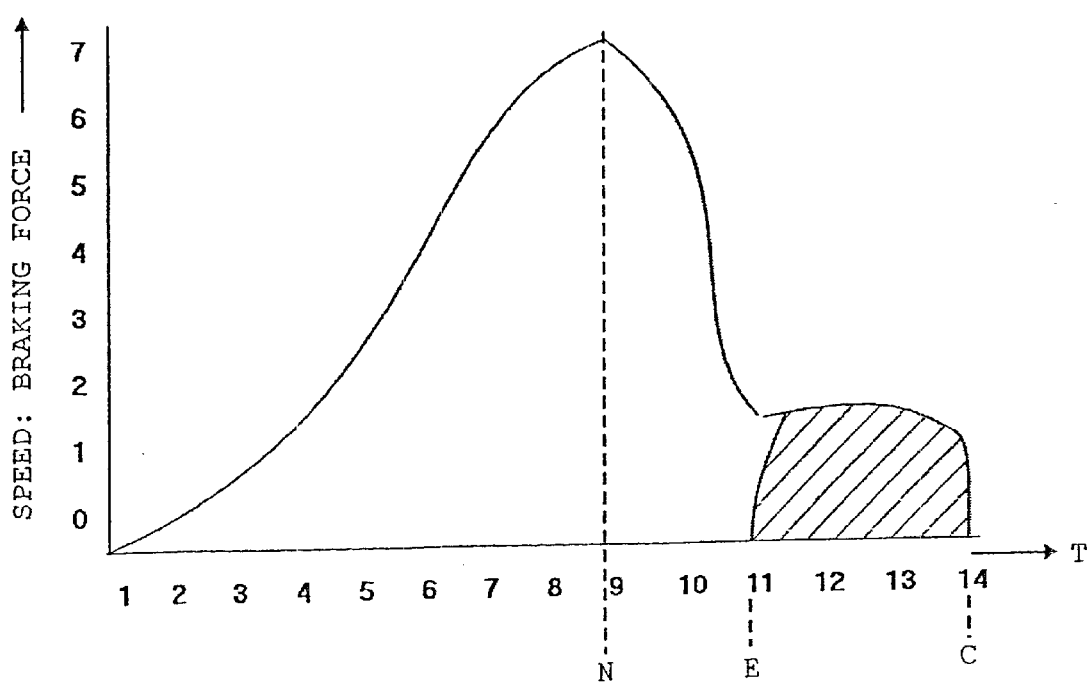
Figure 9:
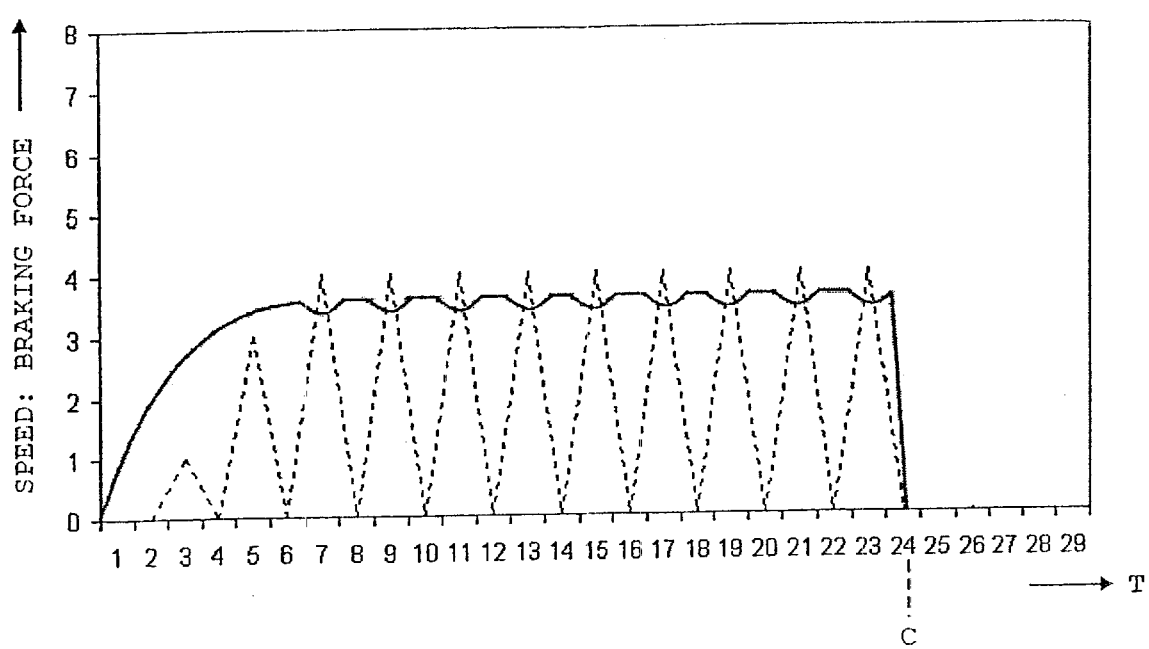

FIGS. 7 to 9 are graphs showing the braking effect relative to the speed of the tracking element for several embodiments of the invention.

When looking at FIG. 7, two different behaviors are shown. The upper curve I describes the case that the tracking element is moved very quickly. In this case no braking effect occurs since the coil will not be energized due to the quick movement of the tracking element.

However, in case the tracking element is moved slowly, the coil will be energized and the braking effect will occur after a slight delay (point B in FIG. 7). Due to the braking effect, the speed of the tracking element will decrease to a nearly constant value (curve II in FIG. 7). The braking effect will continue until it will be stopped by the user by releasing the brake with a mouse click or the like (point C in FIG. 7). The hatched part in FIG. 7 illustrates the time the braking effect is present.

FIG. 8 depicts a typical graph when drawing with the apparatus according to the invention. First, the tracking element is moved quickly until the target is nearly reached (point N in FIG. 8). Here, the speed of the tracking element is reduced until the exact position of the tracking element is reached (point E in FIG. 8). At this point, the braking effect starts (again with a slight delay, as shown in curve B in FIG. 8). Again, the braking effect will continue until it will be stopped by the user by releasing the brake with a mouse click or the like (point C in FIG. 8).

In FIG. 9 there is shown the pulsed braking effect already mentioned above. The continuous line in this figure represents the speed of the tracking element, whereas the broken line represents the braking force. When using a "harder" brake covering like a mixture of felt and rubber, the braking force comes in by pulses, or, with other words, the tracking element moves jerkily. Each time such a pulse occurs, the speed of the tracking element slightly decreases, what is shown by the depressions of the continuous line.

Again, the braking force can be stopped by the user releasing the brake with a mouse click or the like (point C in FIG. 9).

Thus, there are two categories of braking forces. The constant breaking force, using a felt ring as the brake, can ideally be used when drawing freely with the tracking element. Furthermore, it can be used for a linear control of, e.g., film editing machines.

The pulsed breaking force, achieved by using a brake material formed, e.g., by a mixture of felt and rubber, represents a stronger brake and may be used, e.g., for drawing applications like connection schemes or construction programs, which require a certain scanning.

There are also applications which need a constant and precise control. In this case a light sensor, e.g., an IR sensor, may be integrated into the apparatus, so that it can be detected when a user's hand approaches the tracking element, and the braking effect may thus be started before the user touches the tracking element.

The present invention provides a self-applying brake for a tracking element without the necessity of applying a counter pressure. Thus, the tracking element of a cursor control device that controls the movement of a cursor on a computer display can be precisely controlled in the area of lower velocities and stopped. This may be especially advantageous when drawing freely using such a cursor control device.

What is claimed:

1. A cursor control device for controlling the movement of a cursor on a computer display, said cursor control device comprising:

a tracking element; and a braking device operable to apply a braking force on said tracking element, said braking force being dependent on the speed of said cursor, and wherein the braking device further comprises a cylinder carrying a coil and being provided with a first iron core carrying a pin to be inserted into a respective opening provided in a second iron core arranged at an inner bottom portion of a pot-like element, whereby said pin is fixedly connected with a plate arranged at an outer bottom portion of said pot-like element through a bore coaxial to said opening, said second iron core being adapted to slidably move along said pin, and wherein said pot-like element is provided with a ring arranged at a top portion thereof.

2. The cursor control device of claim 1, wherein said tracking element is spherical.

3. The cursor control device of claim 2, wherein said tracking element comprises an iron shell.

4. The cursor control device of claim 1 wherein said tracking element forms part of a mouse, a trackball, or a joystick.

5. The cursor control device of claim 1 wherein said braking force is generated by an electromagnetic device.

6. The cursor control device of claim 5, wherein said electromagnetic device generates a magnetic field that can be periodically switched on and off.

7. The cursor control device of claim 5, wherein said electromagnetic device generates a continuously variable magnetic field.

8. The cursor control device of claim 1, wherein said ring is made of a material selected from the group comprising felt, fleece, rubber, cork or mixtures thereof.

9. The cursor control device of claim 1, wherein said pot-like element is movable between a non-activated and an activated state.

10. The cursor control device of claim 1, wherein the length of said pin is dimensioned such that a distance between a lower surface of said first iron core and an upper surface of said plate is greater than the thickness of said second iron core.

11. The cursor control device of claim 1, comprising one or more cylinders disposed adjacent to said tracking element, each cylinder having a coil mounted therein, whereby an upper end of said cylinder carries a braking surface for engaging with said tracking element, and wherein a lower end of said cylinder has the form of a round plate serving as a stopper, said coil being inserted into a magnetic ring, and a spring being arranged between said ring and said plate.

12. The cursor control device of claim 11, wherein said magnetic ring is secured to a housing and said coil rests on a bottom of said housing.

13. The cursor control device of claim 1, further comprising a light sensor.

14. The cursor control device of claim 13 wherein said light sensor is an IR light barrier.

* * * * *